(12) United States Patent
Dejneka

(10) Patent No.: US 8,516,854 B2
(45) Date of Patent: Aug. 27, 2013

(54) PROGRESSIVE PRESSING TO FORM A GLASS ARTICLE

(75) Inventor: Matthew John Dejneka, Corning, NY (US)

(73) Assignee: Corning Incorporated, Corning, NY (US)

( * ) Notice: Subject to any disclaimer, the term of this patent is extended or adjusted under 35 U.S.C. 154(b) by 519 days.

(21) Appl. No.: 12/623,793

(22) Filed: Nov. 23, 2009

(65) Prior Publication Data

US 2010/0129602 A1 May 27, 2010

Related U.S. Application Data

(60) Provisional application No. 61/117,674, filed on Nov. 25, 2008.

(51) Int. Cl.
*C03B 11/00* (2006.01)
*C03B 11/06* (2006.01)

(52) U.S. Cl.
USPC .......................................................... 65/106

(58) Field of Classification Search
USPC .......................................................... 65/106
See application file for complete search history.

(56) References Cited

U.S. PATENT DOCUMENTS

| | | | |
|---|---|---|---|
| 3,193,367 A * | 7/1965 | Giffen | 65/70 |
| 3,582,304 A | 6/1971 | Bognar | |
| 4,362,429 A | 12/1982 | Puccio et al. | |
| 4,797,144 A | 1/1989 | DeMeritt et al. | |
| 5,122,177 A | 6/1992 | Yoshizawa et al. | |
| 5,192,353 A | 3/1993 | Trentelman | |
| 5,213,603 A | 5/1993 | Giles et al. | |
| 6,067,819 A * | 5/2000 | Tanaka et al. | 65/26 |
| 6,758,064 B1 * | 7/2004 | Kariya | 65/91 |

FOREIGN PATENT DOCUMENTS

| | | |
|---|---|---|
| GB | 940205 | 10/1963 |
| JP | 61227932 A * | 10/1986 |
| JP | 03028137 A | 2/1991 |

OTHER PUBLICATIONS

Britannica Online Encyclopedia, "Industrial Glass", http://www.britannica.com/EBchecked/topic/234890/industrial-glass.*

* cited by examiner

*Primary Examiner* — Christina Johnson
*Assistant Examiner* — Cynthia Szewczyk
(74) *Attorney, Agent, or Firm* — Walter M. Douglas

(57) ABSTRACT

The invention is directed to a method of forming small, thin glass articles having a thickness of less than 5 mm by the use of a plunger and a die, the die having walls, a terminal area and a transition area in contact with both the walls and the transition area is such that the interior distance dimensions of the die gradually decrease as one progresses from the terminal area through the transition area to the walls.

11 Claims, 7 Drawing Sheets

Figure 6
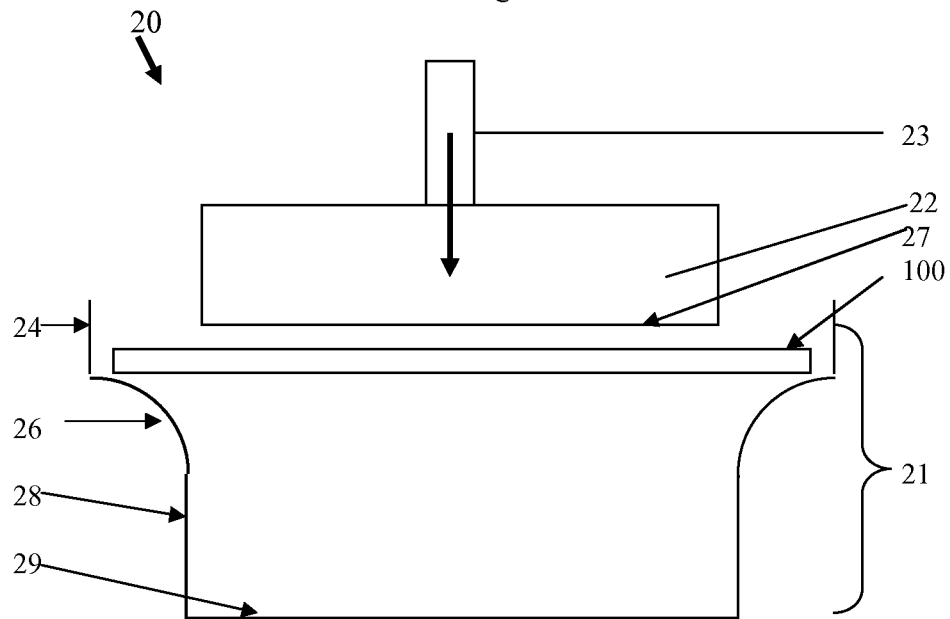
Figures 7A and B
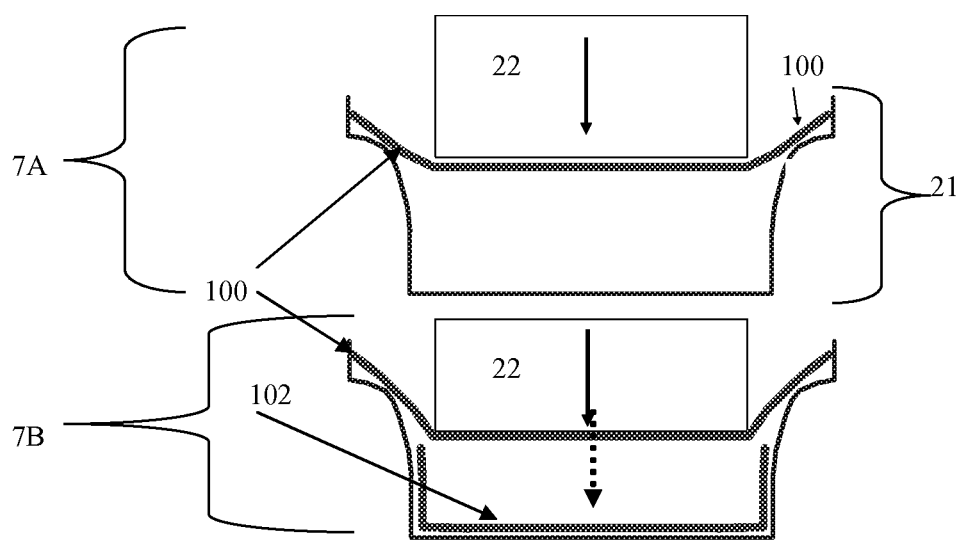

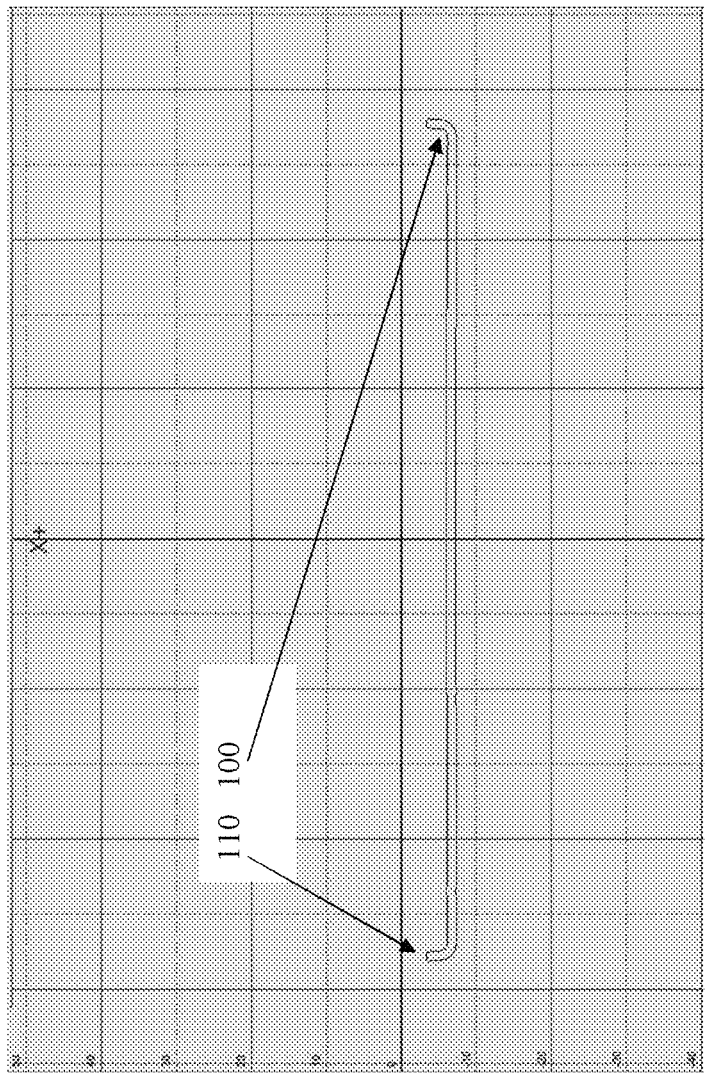

PROGRESSIVE PRESSING TO FORM A GLASS ARTICLE

CROSS-REFERENCE TO RELATED APPLICATIONS

This application claims the benefit of priority under 35 U.S.C. §119(e) of U.S. Provisional Application Ser. No. 61/117,674 filed on Nov. 25, 2008.

FIELD

The invention is directed to a method of making glass articles utilizing pressing in a progressive manner; and in particular to a method enabling the formation of articles of uniform wall thickness and bent edges.

BACKGROUND

The pressing of glass articles in known in the art and has been described in numerous patent applications such as U.S. Pat. No. 4,362,429 (describing a method and apparatus for pressing glass articles from molten sheet glass), U.S. Pat. No. 4,797,144 (describing a method for pressing and molding optical elements), U.S. Pat. No. 5,122,177 (describing a method for pressing sheet glass to form curved automobile windows), U.S. Pat. No. 5,192,353 (describing a method for pressing near net-shape glass articles), U.S. Pat. No. 5,213,603 (describing a plunger/ring apparatus for press-forming glass articles), and U.S. Pat. No. 5,695,537 (describing a method for bending glass sheet to form a curved glass shape).

Glass pressing processes are typically used to produce glass articles such as TV panels, drinking glasses, dishes, flower vases, ashtrays, and also to form performs that will be blow molded in a subsequent step (the "press and blow" method). In these processes a "gob" of molten glass is placed in a mold and a plunger is pressed onto the glass gob to form the article. However, such methods for forming glass articles are not used with small thin sheets of glass such as are described herein. Additional, such methods are performed at viscosities less than the softening point ($10^{7.6}$ Poise) and frequently create "thin spots" in the glass, which are detrimental to the strength of the final article, due to non-uniform glass thickness of the pressed gob. Articles made at lower viscosities also have greater distortion and are unsuitable for high precision forming.

While the foregoing patents describe the formation of glass articles, they have not been found to be useful in the formation of uniformly thin precision glass articles such as those that can be used as housings in small electronic devices; for example, cell phones, personal music devices, calculators and other small devices. The methods known in the art do not enable the formation of thin glass articles that that can be used in such devices. Consequently, it is highly desirable to develop a process that enables the formation of thin glass articles with dimensional tolerances less than 0.2 mm that can be used in a wide variety of devices.

SUMMARY

The invention is directed to a method, herein called "progressive pressing," for forming thin precise glass articles. On one embodiment the articles formed using the method of the invention have a thickness of less than 5 mm. In another embodiment the thickness of the articles is less than 2 mm. In a further embodiment the thickness of the articles is less than 1 mm.

In one embodiment the invention is directed to a method for forming small, thin glass articles, said method comprising the steps of: providing a mold consisting of a die having a cavity and a plunger capable of fitting within the cavity of said die, said die having a bottom, side walls between 45 and 90° relative to the bottom and in contact with said bottom, terminal walls parallel to planes defined by the side walls, and a shaped transition area within said die extending outwardly from said side walls to said terminal area, said transition area being continuous about the interior of the cavity between the side walls and the terminal walls; providing a glass sheet having a length, width and thickness dimensions such that the glass fits within the mold at the junction of the terminal area and the transition area; heating the glass to a viscosity in the range of $10^7$-$10^{13}$ poise; lowering the plunger to contact the glass; applying increasing pressure to the glass; pressing the glass until the side walls are sufficiently bent and thereby form a glass article; optionally cooling the glass to a viscosity>$10^9$ poise; withdrawing the plunger; and removing the glass article from the die. The terminal area serves to align the glass workpiece to the die. The side walls of the terminal are can be beveled, curved, or chamfered to help align the workpiece. The sidewalls can also be replaced with pins, blocks or other alignment devices. Guide pins, rails, slides or other fixtures known to those skilled in the art can be used to align the plunger with the die. In one embodiment the side walls are in contact with a bottom wall. In another embodiment the die is a bottomless die such that the glass article being formed passes through the die and is removed from the bottom. In another embodiment the terminal walls are not parallel to the side walls.

In further embodiments the glass was heated to a viscosity in the range of $10^8$-$10^{10}$ poise.

In another embodiment the plunger is a hollow plunger and the plunger face in contact with the glass has openings in said face, and a vacuum is applied through said plunger via said openings to said glass to hold the glass in place and prevent warpage of the bottom and extract the glass article from the die after it is formed. Optionally, the openings can be pressurized after forming to eject the part from the plunger.

In an additional embodiment the invention is directed to a bottomless die, the plunger is a hollow plunger and the plunger face in contact with the glass has openings in said face, and a vacuum is applied through said plunger to said glass to hold the glass in place and either extract the glass from the die when the article is formed or, when the plunger is pushed completely through the die, to release the formed glass article onto a receiving surface (for example, a suitable conveyor belt or rotating table). The vacuum plunger, in addition to holding the glass in place, also has been found to reduce or eliminate any warping to the glass surface during the pressing process. Optionally, the openings can be pressurized after forming to eject the part from the plunger.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings. Some Figures, for example, those in FIG. 5, may exhibit light reflections.

FIG. 6 is an illustration of a progressive pressing apparatus (die/plunger) having a glass sheet (workpiece) resting on the curved portion of the die.

FIGS. 7A and 7B illustrate the beginning and end of the progressive pressing process.

FIG. 12 shows the measured cross section of a glass article made by the inventive process.

DETAILED DESCRIPTION

Figure 1:
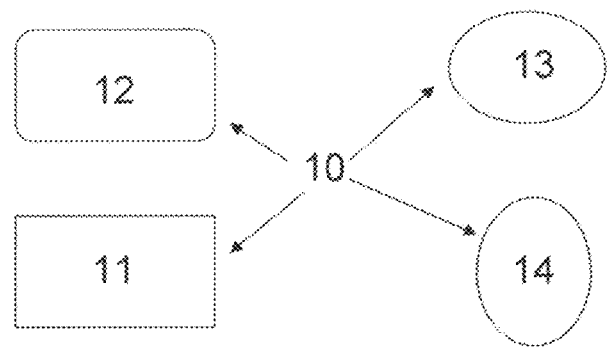
FIG. 1 is an illustration of various shaped glass workpiece that can be used to form glass articles.

It is to be understood that elements not specifically shown or described may take various forms well known to those skilled in the art. For example, the mechanism for raising and lowering a plunger, the heating elements of a furnace or oven, conveyor belts and roundtables, and microwave, radiative, inductive and other heating elements are well known to those skilled in the art for heating glass and, unless related to changes effected by methods and apparatus of the present invention, are not described herein.

Figures shown and described herein are provided in order to illustrate key principles of operation and component relationships along their operational paths according to the present invention and are not drawn with intent to show actual size or scale. Some exaggeration may be necessary in order to emphasize basic structural relationships or principles of operation. Some conventional components that would be needed for implementation of the described embodiments, such as various types of fasteners, alignment pins, guides, and mounts, for example, are not shown in the drawings in order to simplify description of the invention itself. In the drawings and text that follow, like components are designated with like reference numerals, and similar descriptions concerning components and arrangement or interaction of components already described are omitted.

Pressing can be carried out using either a static load or a dynamic load. In one embodiment, using a static load, a glass part is positioned on die, and glass/die combination is placed in a furnace. The plunger is then positioned on to top of the glass and a weight is placed on top of the plunge. The furnace interior containing the glass, die, plunger and weight is then closed and is heated to a temperature in which the viscosity of the glass is in the range of $10^7$-$10^{13}$ poise, and the temperature is maintained for a time sufficient for the glass part to be fully formed. The weight on top of the plunger, combined with the weight of the plunger, applies a constant load to the glass which is pressed into the desired shape. In another embodiment, using a dynamic load, a furnace having a die and a movable plunger is provided. The glass part is positioned on the die and the furnace is closed. The furnace interior can then be heated and the glass plunger can be brought into contact with the glass within as the furnace temperature rises. When the glass reaches a viscosity in the range of $10^7$-$10^{13}$ the plunger places a pressure on the glass to being the forming process. The pressure is continuously increased and applied to the glass to press it into the desired shape. When the pressure reaches a predetermined maximum value, which can be easily be experimentally determined for each thickness of each glass composition, pressure is stopped and the plunger withdrawn. The formed part can then be removed from the die and oven. Using the static method, the static load is in the range of 1-8 kg for glass having a thickness of 2 mm or less. For 1 mm thick parts the static load is in the range of 3-6 kg. For 0.5 mm parts the static load is in the range of 2-5 kg. The static load can be correspondingly adjusted for parts of different thickness and size. When the dynamic method is used the upper limit of the dynamic load falls with the same 1-8 kg limit. That is, for 0.5 mm parts the upper dynamic load limit is in the range of 3-6 kg and for 0.3 mm parts the upper limit is in the range of 2-5 kg.

At the present time, thin glass articles for small devices, particularly those made from small glass sheets or workpiece; have to be made by machining glass substrates. (As use herein the term "sheets" and "workpiece" are used interchangeably.) Presently known methods of vacuum sagging and pressing have not been able to produce thin, complex glass shapes of uniform thickness or with dimensional tolerances less than 0.2 mm. FIG. 1 illustrates, without limitation, different glass shapes that can be used to make glass articles using the method of the invention. In FIG. 1, numeral 11 illustrates a rectangular workpiece having right angle corners, numeral 12 illustrates a rectangular workpiece having rounded corners, numeral 13 illustrates an oval workpiece and numeral 14 illustrates a round workpiece. Each of the workpieces illustrated in FIG. 1 can be processed into an article have the same shape as the workpiece (that is, rectangular, oval or round) using an appropriate plunger/die combination. Workpieces having other shapes than those illustrated in FIG. 1 can also be processed using the method of the invention. For different shaped workpieces one will have to use the appropriately shaped die and plunger. In the Figures accompanying this specification the thickness of the glass used to make the articles illustrated was 1.3 mm (0.13 cm) unless otherwise indicated. In addition, the size of the plunger is smaller than the size of the glass workpiece. For example, when using a 1.3 mm thick workpiece having a length of 15 cm and a width of 6 cm, one would use a plunger having a facial size (the side that contacts the glass workpiece) of 14 cm×5 cm to form an article having a depth of approximately 0.5 cm (5 mm) on each side. The plunger would be centered over the workpiece to achieve these dimensions in the final product.

By way of illustration of the invention, FIGS. 2-5 illustrate glass articles made in accordance with the invention. The glass articles have a rectangular shape that is useful in many small electronic articles such as cell phones, personal music players and other devices. In such devices it is desirable that the thickness of the glass article be as thin as possible while maintaining mechanical reliability. The method of the invention is particularly useful for pressing a glass sheet having a thickness of less than 5 mm and (1), each independently, a length and width (or major axis and minor axis for oblong articles) of less than or equal to 25 cm ($\leq$25 cm), or (2) a diameter of less than or equal to 25 centimeters. In one embodiment the thickness is less than 3 mm. In another embodiment the length and width are each, independently, in the range of 4-15 cm. In another embodiment, the thickness is less than 1 mm. In another embodiment, the bend radius is less than twice the thickness of the glass.

Figure 2:
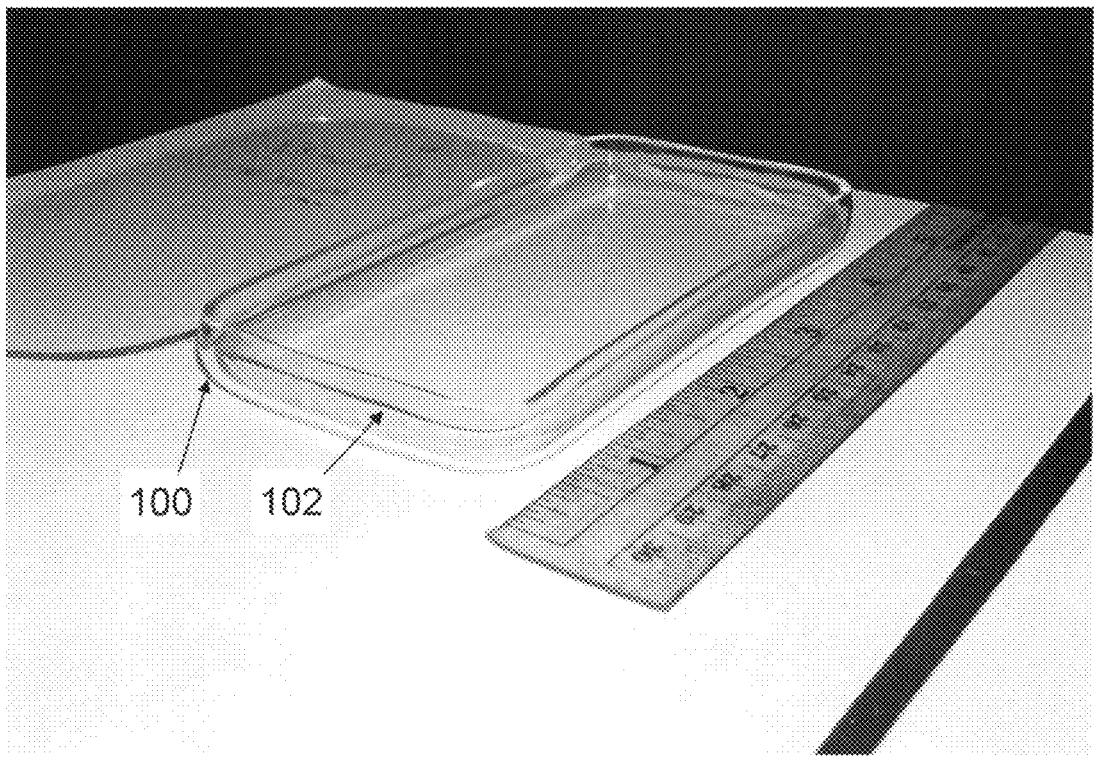
FIG. 2 is a depiction of a glass article (right) and the workpiece or blank from which it was formed (left)
Figure 3:
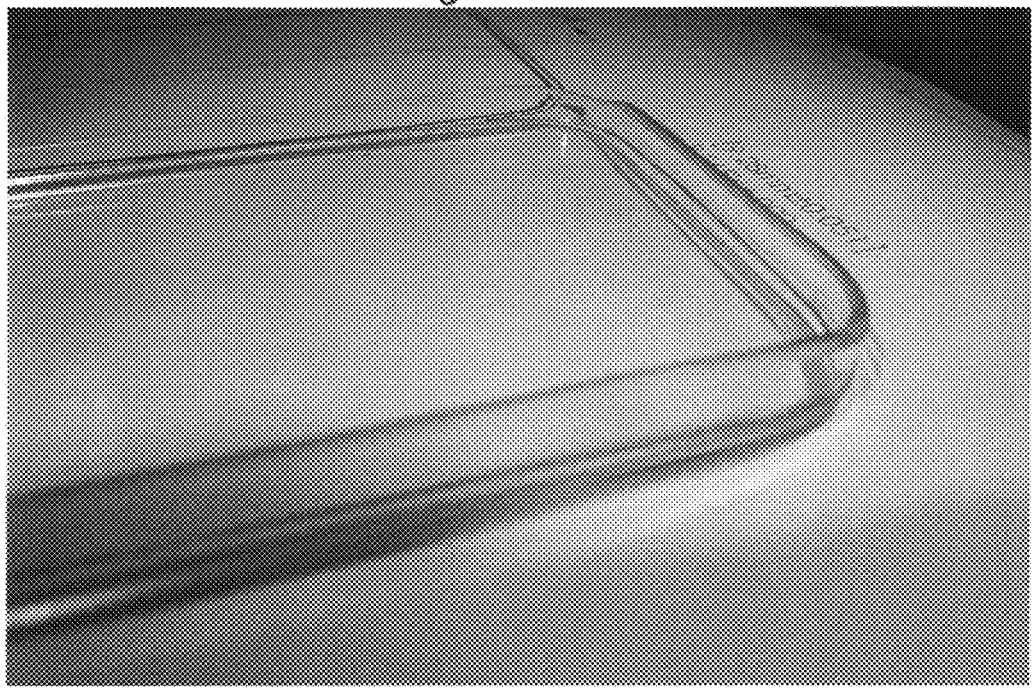
FIG. 3 is a side oblique view of a pressed glass made from a workpiece 12 as illustrated FIG. 1 and showing the depth of the article and its rounded corners.
Figure 4:
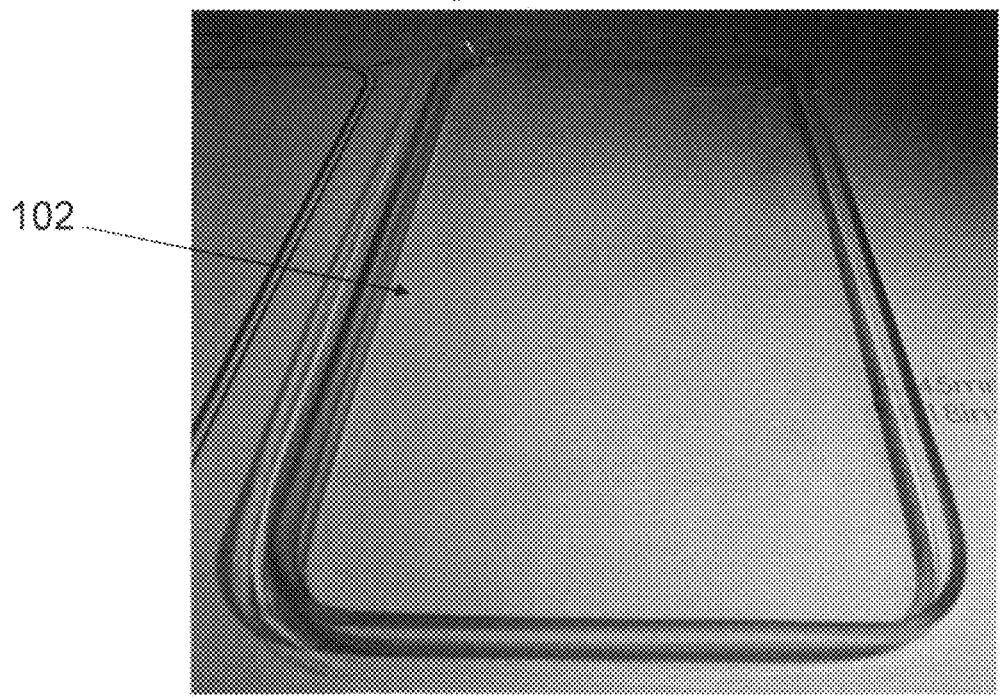
FIG. 4 is an oblique view of the article of FIG. 3.
Figure 5:
FIG. 5 is an oblique view of the sides and bottom two glass articles having different depths.

FIG. 2 illustrates a glass workpiece before (100, left side) and after (102, right side) progressive pressing. FIGS. 3 and 4 are oblique views of the article illustrated in FIG. 2, except that in FIG. 4 only the formed article is illustrated. FIG. 3 is a photograph of an article made using the process described herein. In the process a flat sheet 1.3 mm thick was pressed into a shallow "dish" that has a flat bottom and a continuous sidewall that extends 3.5 mm higher than the base of the dish. The corners of the article are radiused to prevent buckling during pressing. FIG. 5 illustrates two glass articles 102 and 104 with different depths which were formed using the method of the invention, the left article 102 being the same as that shown in FIGS. 2-4. The articles of FIG. 5 are turned upside-down to better illustrate the curvature at the corners and the curved transition of the articles from the bottom of the articles to the side walls. The length and width of both articles are within the range of 4-15 cm, with the left article 102 having an approximate depth of 1 cm (10 mm) and the right article 104 has an approximate depth of 0.3 cm (3 mm).

The articles of FIG. 5 were formed from a small glass sheet or workpiece such as that illustrated in FIG. 2. However, a glass sheet of FIG. 2 would not be suitable for sagging due to the steep wall at right angles to the base which would create stretching of the sidewalls and thus create thin spots in high impact areas of the final article which in turn will result in a mechanically weak article. Pressing hot or molten glass, typically done using a glass gob, is likewise not suitable for forming glass articles having a thickness of less than 1 mm and particularly those having a thickness of less than 0.5 mm. It is especially not suitable for articles with 90° (right angle) sidewalls because the glass cannot flow into the corner areas because of quenching of the glass during the pressing process. However, the progressive pressing process described herein overcomes these difficulties.

Figure 11:
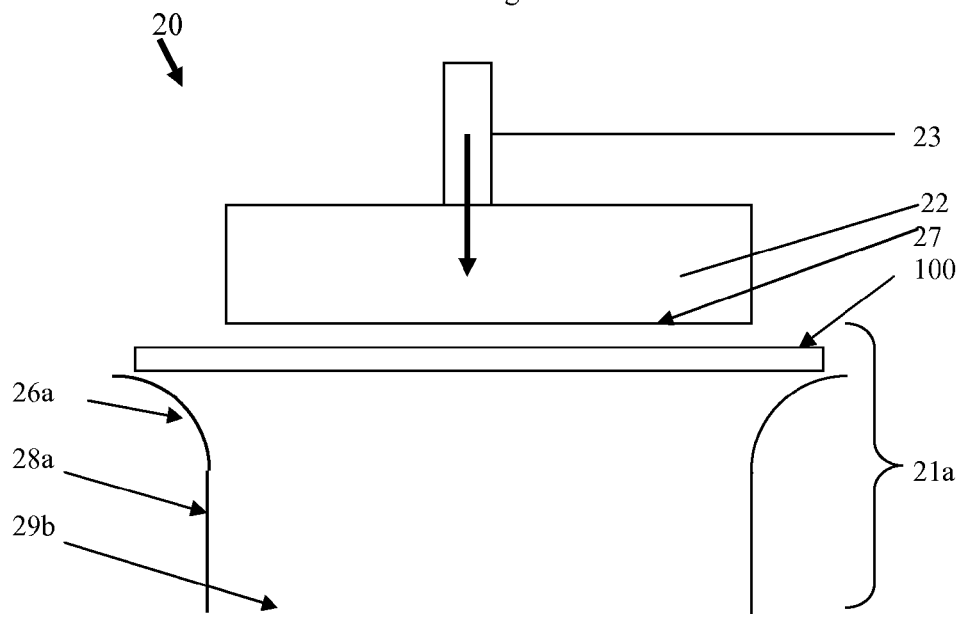
FIG. 11, which is based on FIG. 10, illustrates a bottomless die.

FIG. 6 is a cut-away side drawing illustrating the essential parts of apparatus 20 used to form glass articles according to the invention with elements such as drive mechanisms, the furnace, and others having been omitted. The apparatus 20 has a die 21 and a plunger 22 with movement rod 23 attached to the plunger. The plunger has top, side and bottom walls, the bottom wall being represented by numeral 27 and the other walls being unnumbered. The die 21 has side walls 28 (the front and back side walls not being illustrated), terminal walls 24 (the front and back terminal walls not being illustrated), a bottom wall 29 and a transition area 26 which extends outwardly around the die from side walls 28 to terminal walls 24 as illustrated. The distance between opposing side walls is less than the distance between the opposing terminal walls associated with opposing side due the transition area 26 that extends outwardly around the die between the terminal walls and the side walls, and the terminal walls and side walls on each side of the die are parallel to one another. The shape of the transition region is very important and should be smooth and convex to prevent any sharp edges that could catch on the glass and stretch or gouge it as it is sliding by. The cross section of the transition area 26 can be a simple radius, elliptical, or any other smooth continuous surface. A glass sheet illustrated as 100 is placed on transition area 26 near terminal walls 24 and is heated to between $10^{13}$ and $10^7$ Poise and is then pressed into the formed article. Additional heating of the glass can be carried after it is placed on the transition area, for example, by using infrared radiation. The arrow in FIG. 6 illustrates the downward motion of the plunger. In one embodiment the die in FIG. 6 can have a removable bottom or be a bottomless die such that the glass piece being pressed can pass through the die and be deposited on a receiving surface. See FIG. 11 for an example of a bottomless die.

Figure 10:
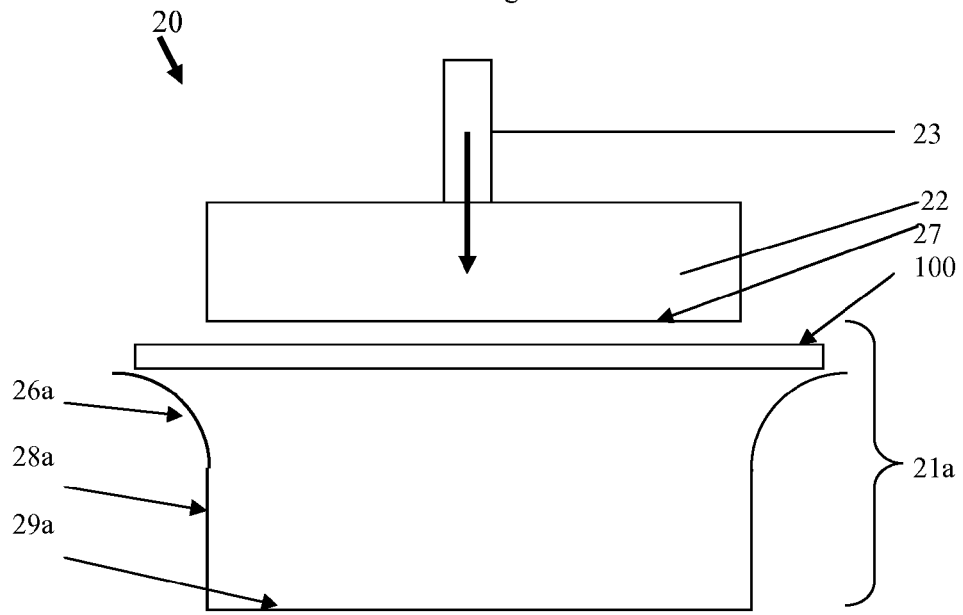
FIG. 10 illustrates a die which does not have terminal walls.

In another embodiment of apparatus 20, as illustrated in FIG. 10, the die 21a does not have terminal walls 24. As illustrated in FIG. 10, the die has side walls 28a (the front and back side walls not being illustrated), a bottom wall 29a and a transition area 26a which extends outwardly around the die 21a from side walls 28a as illustrated in FIG. 10. The plunger 22 and downward movement rod 23 are as described in FIG. 6. A glass sheet illustrated as 100 is heated between $10^{13}$ and $10^7$ Poise and located on transition area 26a and is then pressed into the formed article. Additional heating of the glass can be applied after it is placed on the transition area, for example, by using infrared radiation. The arrow in FIG. 10 illustrates the downward motion of the plunger.

FIGS. 7A and 7B, using a die and plunger as illustrated in FIG. 6, illustrate the pressing process as is begins and as it ends. In FIG. 7A the plunger 22 (rod portion not illustrated) has contacted and applied pressure to the softened glass 100 so that the glass's sides begin deforming as they pass through the transition area 26 to form the glass article. In FIG. 7B numeral 100 illustrates the glass as it has further progressed, compared to FIG. 7A, in the forming process and numeral 102 illustrated the glass article after forming of the article is completed. The broken arrow illustrates the further motion of plunger 22 to form the article. Once formation is complete the plunger is withdrawn and the completed article 102 is removed from the die. In one embodiment, the plunger face can be solid. In another embodiment the plunger 22 and movement rod 23 may be hollow, the plunger face may have openings through the face, and a vacuum may be applied to hold the glass in place during the forming process and remove the glass from the die when the forming process is completed. The apparatus as described in FIG. 10 can be also be used in the pressing process as has been described with reference to FIGS. 7A and 7B.

The glass sheet can be made of any glass suitable for the intended application; for example, borosilicate, aluminoborosilicate, soda lime, silica-titania, silica-alumina, alkali aluminosilicate (for example, Corning Gorilla™ glass) and other glasses known in the art. The glass is first cut into a general shape and the edges are finished (that is, with squared, rounded, polished, ground or otherwise processed to produce the desired surfaces and edges). The glass is then loaded into the apparatus 20 such that ends of the glass 100 rest on the transition area 26 of die 21. The glass 100 and apparatus are then heated to near the softening point of the glass, typically to a temperature where the viscosity of the glass is in the range of $10^7$-$10^{13}$ poise which could correspond to an approximate temperature range of 600-875° C. In preferred embodiments the viscosity is in the range of $10^8$-$10^{12}$ and most preferably between $10^8$-$10^{10}$ poise (680-800° C. for Corning Gorilla™ glass). It is preferred that the glass 100 be pressed as cold as possible (higher viscosity) because the lower the glass temperature as it is pressed the better will be the final article's surface finish and dimensional tolerances. However, the lower the pressing temperature results in a slower pressing process. As a result there is a trade-off between pressing speed and the quality of the final article. The temperature/pressing-pressure choice will be determined by the product's specifications, economics and other factors. In addition, if the glass get too cold, that is, if the glass gets near its $T_g$ or anneal point, it will break rather than bend.

After the pressing process is completed, the article and mold are removed from the furnace; cooled to a temperature below the temperature at which the glass viscosity is in the $10^7$-$10^{13}$ poise range, for example without limitation, to a temperature in the range of 450-650° C. for glass whose viscosity is in the $10^7$-$10^{13}$ poise range at a temperature in the range of 600-875° C.; and the pressed article is then removed from the mold and the article is then further cooled. In one embodiment, for example, for a glass having a viscosity in the $10^7$-$10^{13}$ poise range at a temperature in the range of 600-875° C., the article is removed from the furnace and cooled to a temperature in the range of 480-620° C. before the article is removed from the mold. Generally, the article is cooled to a temperature in the range of 50-150° C. below the temperature at which the glass is formed. In another embodiment, after pressing is completed the article is cooled as indicated above within the furnace, the article and mold removed from the furnace, and the article then removed from the mold.

The shape of the die and plunger are the important parameters in the progressive pressing method of the invention. In the preferred embodiments the die has a radius, bevel, elliptical section, vortex or other gradual transition from the "loading point" of the glass sheet to the final shape as is illustrated in FIG. 6. The shape should progressively form the part starting with the edges and progressing towards the center of the part. This enables the greatest bending moment so pressing can be done at high viscosity where surface finish is best. The progressive shape should be smooth and continuous to avoid any discontinuities that could distort catch, stretch, or otherwise perturb glass sliding and bending to the desired shape. The plunger has a shape that conforms with the shape of the die and the glass article that is to be formed. As illustrated in FIGS. 6, 7A and 7B, the plunger can have rounded or square corners contacting the glass. In preferred embodiments the corners of the plunger are shaped to the form that is desired for the final article; for example, rounded as illustrated in FIGS. 2-5.

In one embodiment of the invention the glass sheet 100 is placed in the die 21 such that it is resting on transition area 26. The die 21, plunger 22 and glass 100 are then heated within a furnace to near the softening point of the glass and the pressure gradually applied to the glass by means of the plunger to press the glass into the die to form the article. When pressing is complete the die is removed from the furnace, allowed to cool and the glass article removed from the die. In a one embodiment bottom 29 of die 20 is not present and the finished glass article is pushed through the die by the plunger onto a receiving surface. In those cases where the die is a bottomless die (bottom 29 not being present), the motion of the plunger continues until the article 102 is in contact with or nearly in contact with a receiving surface (not illustrated). The plunger 22 is then withdrawn, a new glass sheet is placed in the die and heated to near its softening point, and the pressing process repeated.

Figure 8:
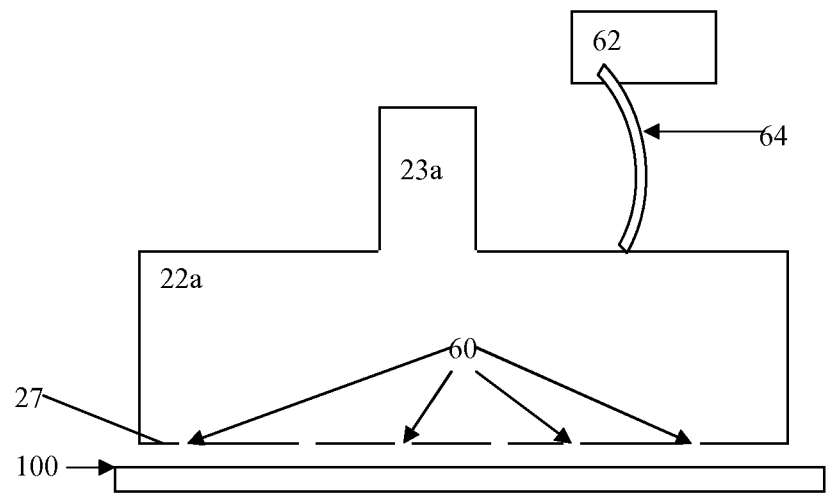
FIG. 8 illustrates a hollow plunger 22a and a vacuum source 62 attached to the plunger/rod assemble to which can be used to hold a glass workpiece in place via opening 60 in face of the plunger that is in contact with the glass workpiece 100.

In a further embodiment as illustrated in FIG. 8, the plunger 22a is hollow and has openings 60 in its bottom face 27 contacting the glass sheet 100 so that vacuum can be applied to the surface of glass 100 contacting the plunger 22a. Rod 23a can be solid or hollow depending on whether there is a vacuum source is connected to the plunger/rod assemble. For example, vacuum is applied by use of a vacuum source 62 which is connected to plunger 22a (or alternatively to rod 23a) by the hollow connector (for example, a hose) 64. Alternatively, if rod 23a is hollow the vacuum source can be connected to the rod. The vacuum holds the glass in place and facilitates removal of a glass article 102 pressed from workpiece 100 from the die. The vacuum is then broken by admission of a gas, so that the article 102 is released and deposited on the receiving surface. When bottom 29 of die 21 is present the vacuum is broken after the piece is withdrawn from die 21 and positioned at a receiving surface. If bottom 29 is not present in die 21 the vacuum is broken when the article 102 has passed through the die and is positioned at the receiving surface.

In a further embodiment the plunger assemble, with or without vacuum, is located within an oven, furnace or other heating apparatus having (1) a conveyer belt passing through the apparatus or (2) a rotating table within the furnace, the belt or table each being capable of holding a plurality of dies with a glass sheet thereon as described herein. The die is moved until it is positioned beneath the plunger at which time the motion of the die is stopped. The plunger then descends, contacts the glass and progressively presses the glass into a glass article as described herein. When the pressing is completed the plunger is withdrawn from the die and the die removed from beneath the plunger and is replaced by a new die having glass sheet 100 therein. Alternatively, when a bottomless die (see FIG. 11 which is based in FIG. 10 except that 29b illustrates the open area at the bottom of the die resulting from the removal of FIG. 10's bottom 29a) is used, the pressed and formed article is pushed out the bottom of the die. The pressed and formed article is then deposited on a surface below the die. Subsequently, the plunger withdrawn through the die, and either the die is removed and replaced by a new die having glass sheet 100 thereon or a new glass sheet 100 is placed in the die. The dies illustrated in FIGS. 6, & a, 7B and 9 can also be bottomless dies.

In one embodiment when the die containing the pressed glass is at a position where it can be removed from the heating area, the die is removed from the heating, taken out of the heating apparatus and the pressed glass article is removed from the die. As dies containing pressed glass articles are removed from the belt or table, additional dies containing unpressed glass sheet are placed on the conveyor belt or rotating table. Alternatively, when a rotating table is used, a new glass sheet is inserted and the cycle is repeated. In one embodiment when a furnace or oven is used as the heating apparatus, the oven has baffles or diaphragms to create zones of different temperature to facilitate heating the glass before and during pressing, and cooling the glass after pressing.

Figure 9:
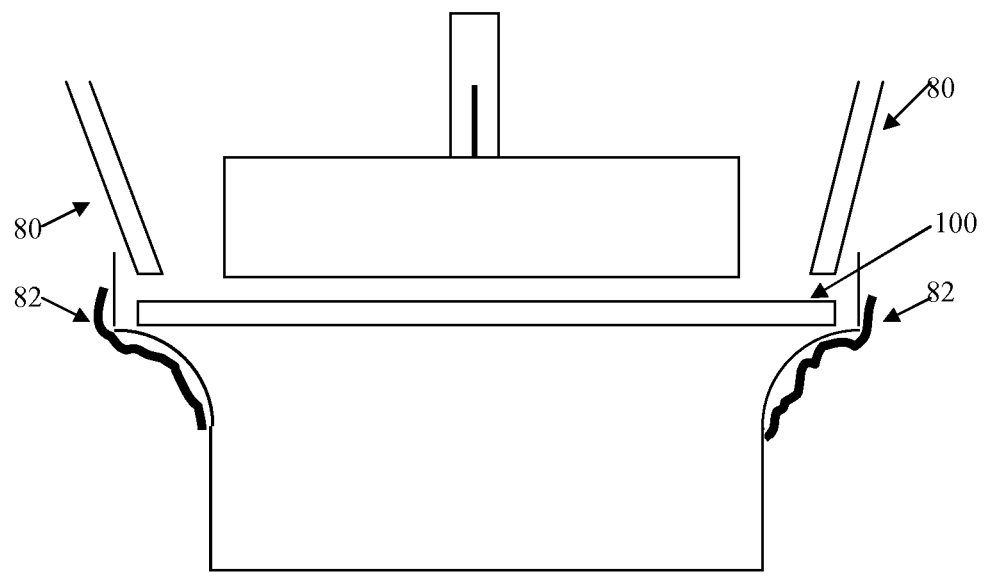
FIG. 9 illustrates how different heat sources as described herein can be applied to heat selected area of glass workpiece 100.

While the foregoing paragraph describe heating the entire plunger, die and glass assembly heated in a furnace or oven, in preferred embodiments of the invention localized heating is used to preferentially heat the areas of the glass that need to deform and/or bend. Localized heating can be carried out using radiative, inductive, microwave, laser, flame or other heating methods known in the art to heat the localized areas that need to deform and/or bend. In one embodiment embodiments heating elements can be placed around the outside of the die at the transition area 26 to also heat the glass by conduction as it transits through the die. FIG. 9 illustrates the apparatus of FIG. 6 (numeral removed for clarity) having at least one heat source 80 that can be a flame, microwave or radiative source directed to the outer portion of workpiece 100. Also illustrated is an inductive heat source or heating coil 82 that the wrapped around the outside of the die in the area where the workpiece is initially placed before pressing begins.

The dies and molds used to make the glass articles can be made of any material for pressing glass. For example, the die/molds can be made of steel and various steel alloys, coated or uncoated with a protective metal (for example without limitation, coated with platinum, titanium or tungsten) and/or release agents known in the art as useful in molding or extruding glass, and they can be made of graphite, coated or uncoated with a release agent. An example of a steel mold is a platinum coated steel mold. In a preferred embodiment the plunger is a coated steel or steel alloy plunger, and the die is a two-part die consisting of an outer piece having a bottom, side wall, transition area and terminal area as illustrated in FIG. 6 and a graphite insert of the same shape for insertion into the outer piece. Ideally the coefficient of thermal expansion (CTE) of the mold is similar to that of the glass to avoid differential stresses or displacements during heat-up or cooldown and to maintain tight dimensional control It is also advantageous to design the size of the glass blank and mold such that there is between 5 and 100 microns of clearance between the "terminal or loading area" and the glass blank at molding temperatures to provide clearance for glass loading, and forming. Radiused, chamfered, rounded, or bull nosed edges of the glass are desirable and prevent the glass sheet from binding or catching on the sides of the dies and plunger. It also provides a finished edge on a shape that would otherwise be too complex to finish after forming.

Any glass known in the art can be progressively pressed according to the method of the invention, subject only to the suitability of the molding equipment with regard to temperatures at which the glass with be pressed and the requirement that it not react with the selected glass at maximum operational temperatures. Glasses that form glass-ceramics can also be formed and simultaneously cerammed to form a finished glass ceramic in the progressive pressing apparatus. Generally, progressive pressing is carried out on glass heated to a viscosity in the range of $10^7$-$10^{13}$ poise which would correspond to an approximate temperature range of 600-875° C. for an alkali aluminosilicate glasses, including ion-exchanged alkali aluminosilicate glasses, for example without limitation, Gorilla™ Glass (Corning Incorporated). In one embodiment the viscosity is in the range of $10^8$-$10^{10}$ poise. Examples of such glasses include borosilicate glass, aluminoborosilicate glass, Gorilla™ Glass (Corning Incorporated) and other glass known in the art as being able to have a viscosity in the range of $10^7$-$10^{13}$ at a temperature of 950° C. or less.

EXAMPLE

A large, approximately 100 cm×100 cm, sheet of aluminoborosilicate glass having a thickness of 1.3 mm was cut into workpiece having dimensions of 7×15 (length×width) for progressing pressing into a glass article. Prior to pressing, the edges of the workpiece were ground and corners rounded as illustrated in FIG. 1. The workpiece placed a mold 21 and seated on transition area 24 at terminal area 24. The mold with the workpiece was then placed in a furnace beneath the plunger 22 previously situated in the furnace. The glass was heated to a viscosity in the range of $10^7$-$10^{13}$ poise and pressed for 15 minutes. The initial applied pressure was sufficient to begin deformation of the glass and the pressure was gradually increased as the pressing progressed. The exact pressures will depend on the glass, how quickly is cools in the pressing apparatus, the thickness of the glass. In an experimental laboratory the pressing was done using a 4 kg weight placed on top of the plunger which caused the glass, heated to a viscosity in the range of $10^7$-$10^{13}$ poise to deform to form the desired shape according to the mold. In accordance with this disclosure, when the glass is pressed it is transformed from a glass sheet into an article having at least one bend greater then 45°. As is illustrated in FIG. 12, which is a cross section drawing illustrating a glass article shown in FIG. 3, in accordance with the process described herein, when the bend is greater than 70° the inner bend radius 100 (the inner bend radius of curvature) is less then 4 times the thickness of the sheet of glass and the adjacent edges 110 to the glass are simultaneously bent. When the bend is greater than 85° and all the edges are bent upward, the radius of curvature of the bend is less than twice the thickness of the glass sheet.

While the invention has been described with respect to a limited number of embodiments, those skilled in the art, having benefit of this disclosure, will appreciate that other embodiments can be devised which do not depart from the scope of the invention as disclosed herein. For example, herein is describes heat treating a glass boule that has a diameter and a thickness, or glass cores taken from a boule, a glass of any shape having a thickness can be treated according to the invention, For example, the glass can be rectangular, square, octagonal, hexagonal, oblate, and so forth. Accordingly, the scope of the invention should be limited only by the attached claims.

I claim:

1. A method for forming, thin glass articles, said method comprising the steps of:
    providing a mold consisting of a die having a cavity and a plunger capable of fitting within the cavity of said die, said die being a bottomless die having side walls between 70° and the perpendicular to the bottomless area of the die, a plurality of terminal walls, and a shaped transition area within said die extending outwardly from said side walls to said terminal area, said transition area being continuous about the interior of the die cavity from the terminal walls to the side walls;
    providing a glass sheet having a length, width and thickness dimensions such that the glass fits within the mold at the junction of the terminal walls and the transition area, wherein the die initially only contacts the glass sheet substantially at the edges;
    heating the glass to a viscosity in the range of $10^7$-$10^{13}$ poise;
    lowering the plunger to contact the glass;
    applying increasing pressure to the glass;
    pressing the glass until the edges of the glass are sufficiently bent and a shaped glass article is formed and the glass article is pressed through the die and deposited on a receiving surface.

2. The method according to claim 1, wherein providing a glass means providing a glass having a thickness of less than 5 mm.

3. The method according to claim 1, wherein the step of heating the glass comprises heating the glass to a viscosity in the range of $10^8$-$10^{10}$ poise.

4. The method according to claim 1, wherein providing a glass means providing a glass having a thickness of less than 2 mm.

5. The method according to claim 1, wherein providing a glass means providing a glass having a thickness of less than 1 mm.

6. The method according to claim 1 wherein the step of heating the glass is undertaken using a method selected from the group consisting of radiative, inductive, flame and microwave heating, and placing and heating the die, plunger and glass in an oven.

7. The method according to claim 1, wherein the plunger is a hollow plunger and the plunger face in contact with the glass has openings in said face, and a vacuum can be applied through said plunger to said glass to hold the glass in place during pressing and vacuum is released to deposit the formed glass article on the receiving surface.

8. The method according to claim 1, wherein said glass is selected from the group consisting of borosilicate, aluminoborosilicate, soda lime and alkali aluminosilicate glass.

9. The method according to claim 1, wherein the die has a gradual transition from the loading point of the glass to the final shape of the glass, such that the glass is contacted on the outer half of the workpiece during most of the plunger displacement.

10. The method according to claim 9, wherein the gradual transition is in the form of one selected from the group consisting of a radius, bevel, elliptical section and vortex.

11. The method according to claim 1, wherein said provided glass sheet is made by a downdraw process.

* * * * *